United States Patent
Gonzalez et al.

[11] Patent Number: 4,515,237
[45] Date of Patent: May 7, 1985

[54] AUTOMOBILE SECURITY SYSTEM

[76] Inventors: Jose Gonzalez; Benito Gonzalez, both of 2676 Cromwell Row, South San Francisco, Calif. 94080

[21] Appl. No.: 453,285

[22] Filed: Dec. 27, 1982

[51] Int. Cl.³ .............................................. B60R 25/04
[52] U.S. Cl. ................................... 180/287; 70/240; 70/258; 200/61.93; 200/158; 307/10 AT
[58] Field of Search ................. 180/287; 200/61.85, 200/61.93, 42 R, 161, 158, 5 R; 307/10 AT, 10 R; 70/240, 241, 258

[56] References Cited

U.S. PATENT DOCUMENTS

| | | | |
|---|---|---|---|
| 1,911,739 | 5/1933 | Bangtson | 307/10 AT |
| 2,156,946 | 5/1939 | Closson et al. | 307/10 AT |
| 3,692,965 | 9/1972 | Gardner | 180/287 |
| 3,821,501 | 6/1974 | Parmenter | 307/10 AT |
| 4,092,506 | 5/1978 | Saulters | 180/287 |
| 4,151,508 | 4/1979 | Hensler et al. | 180/287 |

Primary Examiner—Richard A. Bertsch

[57] ABSTRACT

A replacement for a battery ground wire has an insulated wire extending from a battery terminal to a unit disposed at a selected location in an automobile and operable by a key to connect and disconnect the wire to the automobile body as a ground for the battery for selectively disabling the electrical system as a security measure and a hood lock connected in the circuit prevents hood opening during disconnection of battery to ground.

4 Claims, 7 Drawing Figures

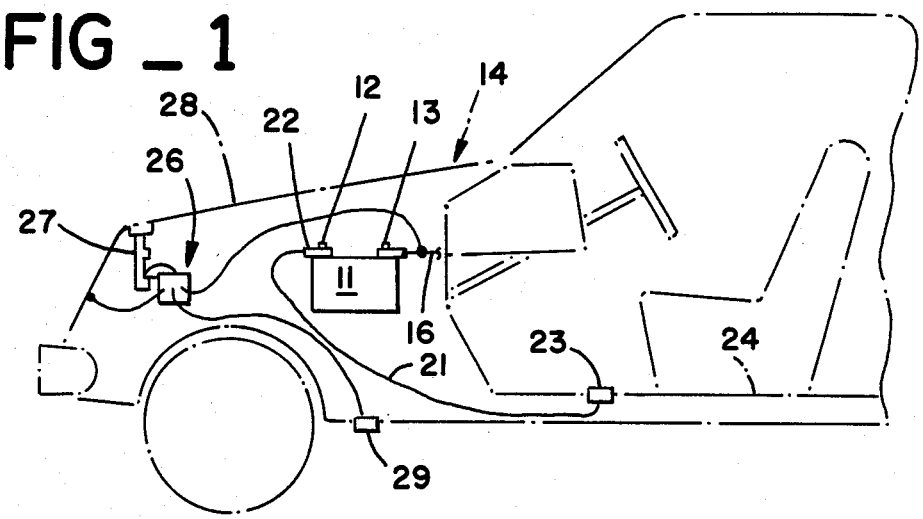
FIG_1
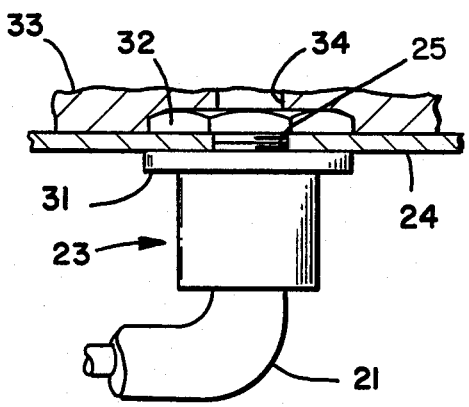
FIG_2
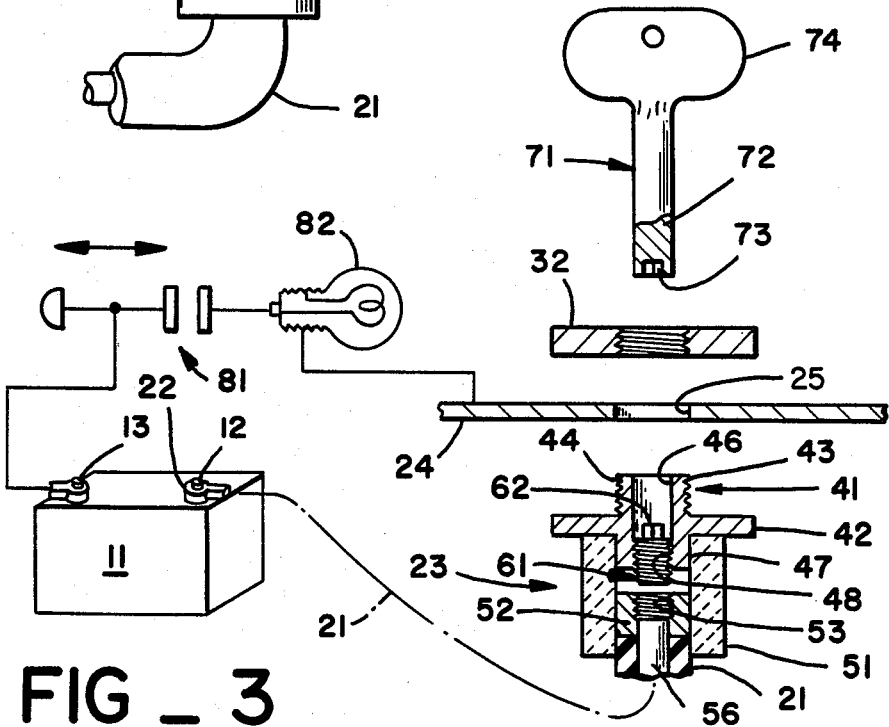
FIG_3

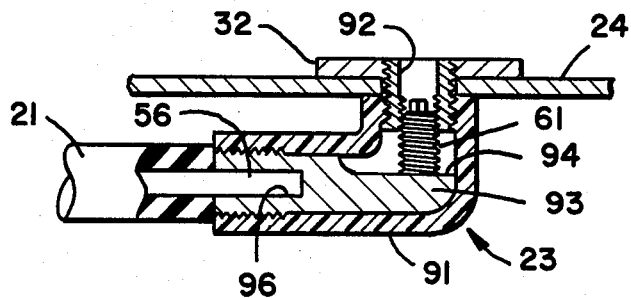
FIG_4
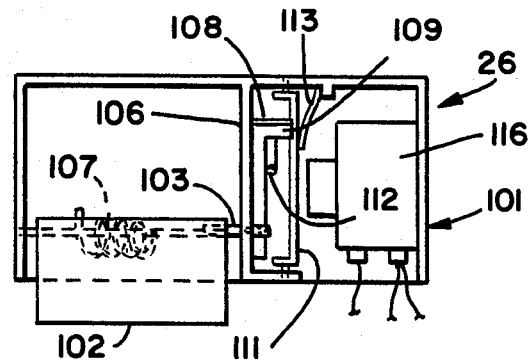
FIG_5
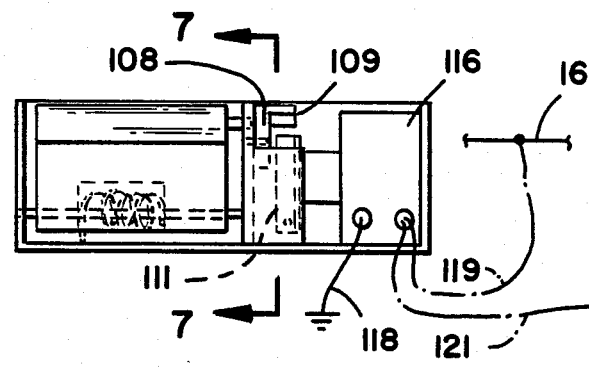
FIG_6
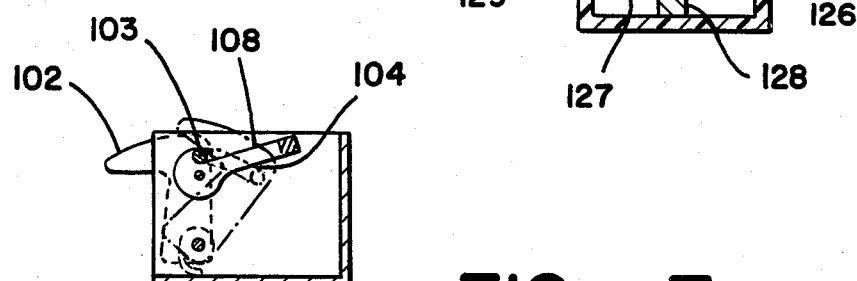
FIG_7

AUTOMOBILE SECURITY SYSTEM

BACKGROUND OF INVENTION

The incidents of automobile theft and misuse have materially increased despite the development and marketing of numerous automobile alarm and protection systems. There have been invented a wide variety of locking and alarm systems which include some quite sophisticated and complicated equipment such as motion sensing units. Many systems of this type are quite expensive.

There also exists many locking devices that are installed by automobile manufacturers. Thus automobiles normally have door locks, ignition locks and often steering wheel locks. Unfortunately, these locking systems have promoted the ingenuity of car theives and the like so that they are now quite readily overcome by the unscrupulous. One of the drawbacks of locks provided as standard equipment is the predictable location thereof so that forcing or bypassing same is facilitated.

The present invention provides a simple automobile security system that is inexpensive so as to be available to most automobile owners and which may have the sole operable element thereof located substantially at the will of the operator so as to be unavailable for tampering.

SUMMARY OF INVENTION

The present invention provides a simple system for controllably disabling the electrical system of an engine in a vehicle such as an automobile, truck or boat. The system hereof replaces the ground wire or cable of an automobile battery. In this respect it is noted that, in automobiles at least, the electrical circuits of electrical components such as spark plugs, lights and the like are completed through electrical ground as represented by the frame and body of the vehicle. Thus disconnection of the battery ground wire from the automobile frame or body will prevent completion of any and all electrical circuits through the switches thereof.

The present invention employs a heavy insulated wire connected to the normally grounded battery terminal of a vehicle and extending to an operating unit which may be located within the vehicle as on the floor of the cab or trunk. The operating unit has a first portion physically and electrically connected to a metal portion of the automobile, such as the floor of a cab, and a second portion connected to the above-noted heavy wire and insulated from the first portion. Within the operating unit there is provided a movable element preferably by threaded engagement thereof for controllably electrically connecting the first and second portions to thus complete the ground connection to the automobile battery. A separate operator, which may be termed a key, is adapted for insertion into the first position of the operating unit for engagement with the movable element to provide for moving same to connect and disconnect the first and second portions of the operating unit. Particular physical engagement of operator and movable element prevents or at least materially inhibits operation of the operating unit by any conventional tool or device.

The system of the present invention is quite simple in construction and is readily installed merely by drilling one hole in the floor, for example, of an automobile. Complete disabling of the electrical system of an automobile is herein provided to prevent theft, unauthorized use or even use by one not competent to drive.

There is also provided as an additional security measure an electrically operated hood latch connected in the electrical circuit of the automobile or the like battery ground disconnection as herein provided which causes the hood to be locked closed so that no one can intentionally ground the battery to bypass the present invention.

BRIEF DESCRIPTION OF FIGURES

The present invention is illustrated with respect to a single preferred embodiment in the accompanying drawings, wherein:

FIG. 1 is an illustration of the present invention connected to a battery in an automobile partially shown in dashed lines;

FIG. 2 is a side elevational view of the operating unit of the present invention mounted in the floor of an automobile;

FIG. 3 is an exploded central vertical sectional view of the operating unit hereof and schematically illustrating connection of the unit to an automobile battery;

FIG. 4 is a central sectional view through an alternative operating unit structure;

FIG. 5 is a top plan view of a hood latch in accordance with this invention with the cover removed;

FIG. 6 is a front elevational view of the hood latch of FIG. 5 and including a central sectional view of an emergency connector; and FIG. 7 is a transverse sectional view taken in the plane 7—7 of FIG. 6 with the central transverse wall removed to illustrate the working parts of the latch.

DESCRIPTION OF PREFERRED EMBODIMENTS

The system of the present invention is adapted to replace the conventional ground wire or cable or a battery employed in a vehicle such as an automobile. In the following discussion the invention is referenced to an automobile, although it will, of course, be appreciated that it is applicable to other types of vehicles such as trucks, pickups and other vehicles having metallic portions of the body or the like that may be employed as a return circuit for electrical circuits of the vehicle.

Referring now to FIG. 1 of the drawing there will be seen to be illustrated an automotive battery 11 having terminals 12 and 13 between which the battery generates a voltage for operation of electrical circuits in an automobile 14 illustrated in dashed lines. In accordance with common practice, the battery 11 is shown to be disposed in an engine compartment of the automobile 14 and also, in accordance with conventional practice, one of the battery terminals 12 is adapted to be grounded to the frame or body of the automobile while the other terminal 13 is adapted to be connected to appropriate switching to electrical devices of the automobile such as lights, ignition and the like, through appropriate switches. These electrical devices of the automobile have one side connected through operating switches to a power line 16 from the terminal 13 and the other side electrically grounded to the frame or body of the vehicle 14. With the battery terminal 12 grounded it will then be seen that operation of the various automotive switches will complete a circuit through lights or the like to operate same from the battery 11. The present invention provides for selectively or controllably disconnecting the ground connection of the battery so that no return circuit is provided for any of the electrical circuits of the vehicle and thus to effectively disable the entire electrical system of the automobile so as to secure the automobile against theft or the like.

The system of the present invention, as generally illustrated in FIG. 1 of the drawings, includes an insulated cable 21 having a battery connector 22 at one end thereof for physically and electrically contacting and engaging the battery terminal 12 and an operating unit 23 at the other end thereof. This operating unit 23 may be mounted upon any body or frame portion of the automobile 14 and in the illustrated embodiment the operating unit 23 is shown to be mounted in a floor 24 of the cab of the automobile. If desired, this operating unit could be mounted on the fire wall of the automobile, or possible in the trunk of the automobile, all at the desire of the one mounting the present invention.

The present invention also includes an electrically operated auxiliary hood latch connected in circuit with an automobile circuit having the ground disconnect feature briefly described above. As shown in FIG. 1 a latch 26 is mounted in the engine compartment of the automobile 14 for engaging a bar 27 depending from the pivotally movable hood 28 of the automobile. This bar 27 has at least one lateral projection for engaging the latch and may have a number of such projections for accommodating different mounting positions of the latch. The latch 26 is electrically operated and has a ground wire and a pair of "hot" wires connected one to the power line 16 from the battery 11 and one to an emergency connector 29, all as further described below. The hood latch operates to lock the hood in closed position in the absence of electrical energization of the latch so that a thief, for example, cannot raise the hood to determine that the battery does not have a conventional ground line. This then further enhances the protection afforded by the present security system.

The operating unit 23 of the present invention is generally comprised as a cylindrical body, as illustrated in FIG. 2, with the insulated cable 21 extending from the bottom thereof. At the top of this body there is provided an exterior flange 31 with an extension of the body adapted to extend through an opening 25 in a floor 24, for example, of an automobile with a nut 32 threaded onto an extension of the body, as described below, and locking the operating unit 23 to the floor 24. This entire unit is primarily disposed beneath or behind a wall or floor element 24 of an automobile and in the illustrated example a carpet 33 normally provided in the cab of an automobile 14 will be seen to extend over the locking nut 32 above the floor 24 and to have a small opening 34 through the carpet to provide access to the operating unit. In this manner the present invention may be relatively hidden within the cab of an automobile for reasons further described below.

Referring now to FIG. 3 of the drawings it will be seen that there is illustrated therein a central vertical section through the operating unit 23 of the present invention and elements associated therewith, particularly with reference to the mounting of same on a floor 24 of a vehicle. There is provided as part of the operating unit 23 a cylindrical body 41 formed of a metal such as brass or the like and having a central external flange 42 thereabout. An upper portion 43 of the cylindrical body has external threads 44 thereabout and this body 41 has a central bore or aperture 46 therethrough with a lower portion 47 of the body having internal threads 48 therein. The upper portion 43 of the cylindrical body 41 is adapted to fit through an aperture 25 formed or drilled in a floor or other body portion of an automobile 14 with the nut 32 having internal threads adapted to mate with the external threads 44 of the body portion so as to lock this body portion onto the floor 24 of the automobile with the nut 32 bearing on an upper surface thereof. The operating unit 23 also includes a hollow cylindrical insulating element 51 formed of ceramic, for example, which fits about the lower portion 47 of the body 41 and into which there is inserted and secured therein a hollow cylindrical plug 52 having a central tapped bore 53. The insulated cable 21 is adapted to fit within the lower end of the central opening through the insulating cylinder 51 with a central electrical conductor 56 of the cable 21 extending into electrical and physical contact with the plug 52 within the threaded bore 53 thereof. The portions 41, 51 and 52 of the operating unit 23 may be cemented together and the cable 21 may be cemented into the bottom thereof to provide a unitary construction of the operating unit.

Within the operating unit 23 there is also provided a movable element 61 comprised as a metallic cylinder having external threads thereabout adapted to mate with the internal threads 48 of the unit 41 and the internal threads 53 of the lower portion 52 of the operating unit. This cylindrical movable element 61 is provided with a particular upper configuration for mating with the bottom configuration of an operator or key 71 which is adapted to be fitted into the bore 46 of the upper portion 41 of the operating unit 23. This upper configuration of the movable element 61 may, for example, be comprised as a square boss 62. The operator 71 is provided in the shape of a key or the like with a cylindrical shank 72 having, in this instance, a square indentation 73 in the bottom end thereof and an insulating handle 74 at the top thereof. It will be appreciated that the operator 71 has no capability of transmitting electrical current in accordance with the present invention; however, the insulating handle or top portion 74 is preferably provided as an insulator in order to reassure the general public or any automobile driver or the like who may use the present invention that he or she may not be subject to electrical shock. The rectangular recess 73 in the bottom of the operator 71 is adapted to mate with the square boss 62 on the movable element 61 so that it is possible for the driver of an automobile 14 to insert the operator 72 into the operating unit 23 through the bore 46 in the first portion of the latter so as to engage the boss on the movable element 62 and, in consequently, to rotate this movable element into electrical and physical contact with the lower or second portion 52 of the operating unit. This will then be seen to provide electrical connection between the first and second portions 41 and 52 of the operating unit 23 so as to complete electrical connection between the wire 56 of the cable 21 and electrical ground as represented by the element or floor 24 of an automobile.

It will be seen that the operator or key 71 of the present invention may be employed to connect and disconnect electrical ground of the electrical system of the present invention. Referring further to FIG. 3 of the drawings there is illustrated also therein a battery 11 having a ground terminal 12 thereon with a connector 22 engaging same. As shown in FIG. 3 by dashed lines an insulated wire 21 extends from this connector 22 through the operating unit 23 of the present invention to electrical ground.

The operating unit 23 of the present invention may be alternatively configured and referring to FIG. 4 there will be seen to be illustrated another possible configuration. There is provided a hollow plastic elbow 91 having internal threads at both ends thereof with an externally threaded cylinder 92 threaded into the upper vertical end of the elbow 91 for extension through an opening in the floor or the like 24 of an automobile so that the nut 32 may be threaded thereon to lock the elbow to the floor. Within the horizontal portion of the elbow 91 there is threaded a solid metal cylinder 93 with a flat longitudinal surface 94 at the inner end thereof for disposition below the opening in the threaded cylinder 92. The movable element 61 is threaded in the bottom of the cylinder 92 and thus may be rotated to move downwardly to place the bottom of the movable element 61 in electrical contact with the flat surface 92 of the cylinder 93. The electrical conductor 56 of the cable 21 extends into a longitudinal bore 96 in the outer end of the cylinder 93 and may be soldered therein with the insulating portion of the cable tightly engaging the end of the plastic elbow 91 so as to seal the connection. A sealant may be employed about this connection, if desired. It will be appreciated that the embodiment of the operating unit illustrated in FIG. 4 operates in the same manner as the embodiment described above with respect to FIG. 3, although the physical structure differs therefrom in certain aspects.

Considering now operation of the present invention and referring again to FIG. 3 it is noted that conventional automotive electrical circuits are connected from the ungrounded terminal 13 of the battery 11 to one side of an electrical switch 81, with the other side thereof being connected to a lamp 82, for example, and the other side of the lamp in turn connected to some electrically conducting portion of the automobile, as a return circuit to the battery. It will then be appreciated that a complete electrical circuit through the lamp 82 can only occur if there is indeed a connection between the body or frame of the automobile and the ground terminal 12 of the battery 11. The present invention operates to selectively remove this ground connection by the operator 71 to interrupt any and all electrical circuits of the automobile. The ground terminal 12 of the battery 11 is in fact not grounded nor connected to a metallic return circuit for the electrical circuits of the automobile 13 and only by moving the movable element 61 of the operating unit 23 by the operator 71 is it possible to complete the electrical circuit of the automobile.

The auxiliary hood latch 26 of the present invention may be configured in a variety of ways; however, it basically incorporates a magnetically operated latch mechanism which is open or movable when electrical current is passed through a coil to generate a magnetic field and which is closed or locked in the absence of this electrical current. In FIGS. 5, 6 and 7 there is illustrated one embodiment of a hood latch in accordance with the present invention. Referring to these Figures there will be seen to be provided a housing 101 which is adapted to be fitted within a cover or enclosure which is not shown in the drawings. A latch member 102 having a laterally extended head is pivotally mounted adjacent the bottom of the member between upright walls of the housing 101 and carries a longitudinally extending pin 103 which fits within a curved slot 104 in a central upright wall 106 of the housing. A spring 107 is disposed about the latch shaft with one end bearing upon the latch and the other end bearing upon the bottom of the housing to normally pivot the latch into upright position with the head 102 thereof extending laterally from the housing as illustrated in FIGS. 5 and 7. A pawl or the like 108 is pivotally mounted on the central wall 106 on the opposite side thereof from the latch 102 with a cut out portion adapted to engage the pin 103 and including an arm extending from the pivotal point along the central wall 106 with a lateral lug or extension 109 at the end thereof. A pivot plate 111 is pivotally mounted at the bottom thereof between front and back walls of the housing adjacent the pawl 108 and a vertical pin 112 extends upwardly from the floor of the housing alongside of the wall so that the plate 111 will rest against this pin beneath the lug 109 of the pawl 108 when the plate is in pivoted or inclined position, as illustrated in FIG. 5. A small leaf spring 113 is secured to the plate 111 and extends into engagement with a projection or indentation in the back wall of the housing to normally urge the plate 111 into pivoted position, i.e., disposition beneath the lug of the pawl so that the pawl cannot rotate. In this position the latch 102 is locked in latching or upright position.

The latch mechanism also includes a coil 116 having an iron core or the like and mounted in the housing with the core positioned to engage the pivot plate 111 when the latter is in vertical position such as illustrated in FIG. 6. The pivot plate 111 is formed of a magnetic material such as iron or steel and thus energization of the coil 116 will pivot the plate 112 against the small force of the leaf spring 113 from inclined position to vertical position, i.e., from the position of FIG. 5 to the position of FIG. 6. This then moves the plate 111 out from beneath the lug in the pawl 108 so that the pawl is free to be rotated. Consequently, the latch member 102 may then be pivoted against the force of the spring 107 into the position illustrated in dashed lines in FIG. 7. The pin 103 on the latch 102 will ride along the slot 104 in the wall 106, again as shown in FIG. 7.

It will be appreciated from the foregoing that the latch mechanism will remain in locked position at all times that the coil 116 is deenergized and will only become unlocked when a current is passed through the coil 116 to pivot the plate 111 into upright or vertical position.

Energization of the coil 116 is accomplished by connection of one terminal thereof to electrical ground by a wire 118 and connection of the other terminal to the power line 16 of the automobile by a wire 119. It will thus be seen that the latch mechanism 26 is only energized when the electrical circuit of the automobile is operable or complete and will be deenergized so as to lock the latch at any time the operator 23 of the present security system is employed to disconnect the automobile battery 11 from ground. This then provides another degree of safety wherein the hood of the automobile cannot be lifted when the security system is operable to secure the automobile.

It is, of course, possible for an automobile battery to lose its charge or to fail for some reason so that no current is available therefrom. In the absence of current through the coil 116 of the auxiliary latch 26 the hood of the automobile is locked in closed position and in order to prevent possible difficulties from a dead battery wherein the hood must be raised even though no electrical current is available, the present invention furthermore provides an emergency connector 29 connected by a wire 121 to the input terminal of the coil 116. This emergency connector is adapted or intended to be mounted beneath the automobile, for example, in some relatively inaccessible and unobvious position so as to be unavailable to a thief or the like. Release of the latch mechanism 26 may then be accomplished by connecting an external battery between the connector 29 and electrical ground to pass current through the coil 116 of the latch and release same. This emergency connector may, for example, be formed of a plastic cylinder 126 having a closed top with a laterally extending flange thereabout apertured to receive bolts or screws to secure the connector to the underside or other location of the automobile 14. At the bottom of the plastic cylinder 126 there is provided a metal plate 127 with a central lug 128 depending therefrom and the insulated wire 121 extends through the top of the cylinder 126 with the central conductor of this wire physically and electrically engaging the metal plate 127. A plastic cap 129 is provided to snap over the lower end of the emergency connector to cover the lug 128 and close the bottom of the connector. A jumper cable may be readily attached by clamping jaws to the lug 128 so that an auxiliary battery may then be employed to release the auxiliary latch 26.

It is noted at the present time that the operating unit of the present invention, not only provides for disabling any and all electrical circuits of an automobile by utilization of the operator 17, but also that the present invention is adapted to have the operating unit mounted at the whim of the vehicle owner so that the location of this operator may be wholly unobvious. In particular, it is noted that the operating unit 23 may, for example, be disposed on the floor 24 of the cab of a vehicle beneath the carpet 33 therein with only a very small opening 34 in the carpeting. The actual physical location of this opening 34 may be varied in accordance with the desires of one installing the present invention and this opening 34 may substantially coincide with the diameter of the shank 72 of the operator 71 so that only precise knowledge and feeling for the appropriate positioning of the operator 71 will allow anyone to enable the electrical circuits of the automobile. This in itself militates against theft of an automobile for it is well recognized that it is not possible to start the automobile without electrical energization and "jumping" of the power cable 16 will be of no avail when the present invention has been installed upon an automobile. Furthermore, electrical "jumping" of the present invention as by temporarily connecting the ground terminal 12 of the battery 11 to the body or frame of the present invention will only allow starting of the automobile but will then substantially cause disconnection of the battery from the electrical circuitry so that the electrical circuits will not be energized at iding speed of the automobile for the battery will not be available to provide power to these electrical circuits. Further to the foregoing it is noted that should one enter even his own automobile which has been outfitted with the present invention and should this person or potential driver have less than normal facilities as by the ingestion of alcohol or other chemicals, it would be somewhat unlikely that he or she would be able to properly insert the operator 71 through a carpet 34 into the operating unit 23 in order to actuate the electrical circuits of the automobile.

There is provided by the present invention a marked improvement in security systems for automobiles which not only militates against the possible theft or unauthorized use thereof but also provides a material protection for the owner thereof should he or she be less than normally capable of operating the automobile.

There has been described above the present invention with respect to particular preferred embodiments thereof; however, it will be appreciated by those skilled in the art that numerous modifications and variations may be made within the spirit and scope of the present invention and thus it is not intended to limit the invention to the details of illustration or precise terms of description.

What is claimed is:

1. An automobile security system comprising,
   an elongated insulated cable adapted for connection to a ground terminal of the automobile battery in place of the ground wire thereof,
   an operating unit adapted for physical and electrically connection at a first electrically conducting portion thereof through a metal portion of an automobile body,
   such operating unit having a second electrically conducting portion electrically insulated by a hollow insulator from said first portion and electrically connected to said cable,
   an interior electrically conducting movable element disposed for movement into and out of electrical connection between said first and second portions through said hollow insulator by threaded engagement with the interior of said first portion to controllably engage a surface of said second portion and
   an operator adapted for insertion into said operating unit engaging said movable element for movement thereof into and out of electrical connection with said second portion of said operating unit to controllably disable all electrical circuits of said automobile.

2. The system of claim 1 further defined by
   said operating unit including a hollow elbow-shaped insulator having said first portion secured at the top thereof and said second portion disposed in a perpendicularly extended bottom portion of said insulator with an end disposed in spaced alignment with said first portion for engagement by said movable element.

3. In an automobile security system having an elongated insulated cable connected to a ground terminal of an automobile battery in placed of the ground connection thereof,
   an operating unit having a first portion connected to an automobile body and a second portion connected to the cable and insulated from the first portion with an interior movable element movable into and out of electrical contact between said first and second portions,
   an operation configured to engage said movable element within said operating unit for movement of said element into and out of electrical connection between said first and second portions of said operating unit, the improvement comprising,
   an auxiliary hood latch including means for mounting in an engine compartment of an automobile and including
   a pivotally mounted latch member configured to engage a member depending from an automobile hood for securing the hood in closed position,
   an element normally biased to prevent pivoting of said latch member,
   a coil disposed to magnetically move said element away from said latch member to release same for pivoting, and electrical connections connecting said coil between electrical ground and the ungrounded side of the automobile battery, whereby said latch is locked during ungrounding of the battery by said operating unit and is unlocked to be pivoted by coil energization during grounding of said battery by said operating unit.

4. An automobile security system comprising, an operating unit having a first portion connected to an automobile body and a second portion connected through a cable to a ground terminal of an automobile battery in place of a battery ground wire and an internal movable element in said operating unit movable to connect and disconnect said first and second portions, an operator insertable in said operating unit for engaging said internal movable element for movement thereof into and out of electrical connection between said first and second portions of said operating unit to controllably disable the electrical circuits of said automobile; and an auxiliary hood latch for a hood of an automobile having means for mounting said latch within an automobile engine compartment and having a coil connected between electrical ground and the ungrounded side of the automobile battery for releasing said latch only during coiled energization, and an emergency connector including a terminal electrically connected to the ungrounded side of said coil and adapted for disposition exteriorly of the automobile engine compartment whereby said coil may in emergency be energized by an exterior battery to release said hood latch.

* * * * *